United States Patent
Li et al.

(10) Patent No.: US 10,509,642 B2
(45) Date of Patent: Dec. 17, 2019

(54) INTELLIGENT DISCOVERY AND APPLICATION OF API CHANGES FOR APPLICATION MIGRATION

(71) Applicant: International Business Machines Corporation, Armonk, NY (US)

(72) Inventors: Guo Qiang Li, Beijing (CN); Cheng Fang Wang, Beijing (CN); Ping Ping Cheng, Beijing (CN); Zhen Zhang, Beijing (CN); Chang Ning Song, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/941,370

(22) Filed: Mar. 30, 2018

(65) Prior Publication Data

US 2019/0303135 A1    Oct. 3, 2019

(51) Int. Cl.
*G06F 8/658* (2018.01)
*G06F 8/71* (2018.01)

(52) U.S. Cl.
CPC .............. *G06F 8/658* (2018.02); *G06F 8/71* (2013.01)

(58) Field of Classification Search
CPC ... G06F 8/65; G06F 8/658; G06F 8/71; G06F 8/656; G06F 8/61; G06F 8/60
USPC .......................................................... 717/170
See application file for complete search history.

(56) References Cited

U.S. PATENT DOCUMENTS

| | | | |
|---|---|---|---|
| 6,546,552 B1* | 4/2003 | Peleg | G06F 8/658 717/170 |
| 8,020,146 B2 | 9/2011 | Hudson, Jr. | |
| 8,438,558 B1* | 5/2013 | Adams | G06F 8/658 717/170 |
| 8,495,564 B2* | 7/2013 | Martineau | G06F 8/35 717/106 |
| 9,411,562 B2 | 8/2016 | Venkata | |
| 9,760,384 B1 | 9/2017 | Chauhan et al. | |
| 2002/0099726 A1* | 7/2002 | Crudele | G06F 8/658 |
| 2004/0267833 A1* | 12/2004 | Meller | H03M 7/30 |
| 2005/0027758 A1* | 2/2005 | Meller | G06F 8/654 |
| 2006/0041873 A1* | 2/2006 | Pandarinathan | G06F 8/71 717/141 |

(Continued)

OTHER PUBLICATIONS

Kim et al ;"Identifying and Summarizing Systematic Code Changes via Rule Inference",19 pages (Year: 2013).*

(Continued)

*Primary Examiner* — Wei Y Zhen
*Assistant Examiner* — Brahim Bourzik
(74) *Attorney, Agent, or Firm* — Cantor Colburn LLP; Noah Sharkan

(57) ABSTRACT

Embodiments of the present invention provide a computer-implemented method for generating an API difference description file that describes the differences between multiple API versions to assist in migrating an application program from a first version to a second version. The method includes receiving a first API description file of a first version of a web API, receiving a second API description file of a second version of the web API, generating an API difference description file that describes differences between the first and second API description files, and then updating an application program using the API difference description file.

17 Claims, 7 Drawing Sheets

(56) References Cited

U.S. PATENT DOCUMENTS

| | | | |
|---|---|---|---|
| 2006/0225040 A1* | 10/2006 | Waddington | G06F 8/71 717/122 |
| 2008/0022266 A1 | 1/2008 | Hudson | |
| 2009/0150851 A1* | 6/2009 | Boer | G06F 9/44536 717/100 |
| 2011/0113414 A1* | 5/2011 | Ewington | G06F 8/63 717/168 |
| 2015/0058833 A1 | 2/2015 | Venkata | |
| 2017/0102925 A1 | 4/2017 | Ali et al. | |

OTHER PUBLICATIONS

Mell et al.; "The NIST Definition of Cloud Computing—Recommendations of the National Institute of Standards and Technology"; US Department of Commerce—National Institute of Standards and Technology; Sep. 2011; 7 pages.

* cited by examiner

INTELLIGENT DISCOVERY AND APPLICATION OF API CHANGES FOR APPLICATION MIGRATION

BACKGROUND

The present disclosure relates to migration of applications in view of newly released versions of application program interfaces (APIs), and more specifically, to the automated discovery of web API changes and generation of an API difference description (ADD) file to describe the difference between multiple API versions.

Application programs often require access to proprietary or large datasets, or computational functionalities. Some web services may provide access by providing such resources over the Internet. Service oriented computing standards were created to define various implementation aspects of web services. For example, Universal Description Discovery & Integration (UDDI) addresses service identifiability, the simple object access protocol (SOAP) prescribes how to implement service interfaces to enable interoperability, and the web service description language (WSDL) guarantees uniform, machine-readable service descriptions. Concepts like identifiability, interoperability, or composability may not be universally adopted by programmers, and thus, web application programming interfaces (web APIs) descriptions generally do not follow any one standard. Consequently most web services expose APIs having diverse conventions with descriptions may not be easily convertible from one standard to another. Some API management platforms allow API providers to publically publish their APIs. In an effort to make APIs more understandable and easy to use by API consumers (e.g., application program developers), API providers often publish an API description file using API description language (DL) together with their published public web API to assist in migrating an application from one version to another.

Because many API providers make frequent changes to their web APIs, consumers who wish to apply a latest API version are tasked to update their developed applications quite often. Presently, however, API consumers are required to perform a complex process to update their applications from a first version to a second version. The process is time consuming, labor intensive, and prone to user error.

SUMMARY

Embodiments of the present invention provide a computer-implemented method for generating an ADD file that describes differences between multiple API versions to assist in migrating an application program from a first version to a second version. A non-limiting example of the method includes receiving, by a system comprising one more processors, a first API description file of a first version of a web API. The method includes receiving, by the system, a second API description file of a second version of the web API. The method includes generating, by the system, an API difference description file that describes differences between the first and second API description files. The method includes updating, by the system, an application program using the API difference description file.

Embodiments of the present invention provide a system for generating an ADD file that describes differences between multiple API versions to assist in migrating an application program from a first version to a second version. The system includes one or more processors configured to perform a method. A non-limiting example of the method includes receiving, by the system, a first API description file of a first version of a web API. The method includes receiving, by the system, a second API description file of a second version of the web API. The method includes generating, by the system, an API difference description file that describes differences between the first and second API description files. The method includes updating, by the system, an application program using the API difference description file.

Embodiments of the invention provide a computer program product for generating an ADD file that describes differences between multiple API versions to assist in migrating an application program from a first version to a second version, the computer program product comprising a computer readable storage medium having program instructions embodied therewith. The program instructions are executable by a system comprising one or more processors to cause the system to perform a method. A non-limiting example of the method includes receiving, by the system, a first API description file of a first version of a web API. The method includes receiving, by the system, a second API description file of a second version of the web API. The method includes generating, by the system, an API difference description file that describes differences between the first and second API description files. The method includes updating, by the system, an application program using the API difference description file.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
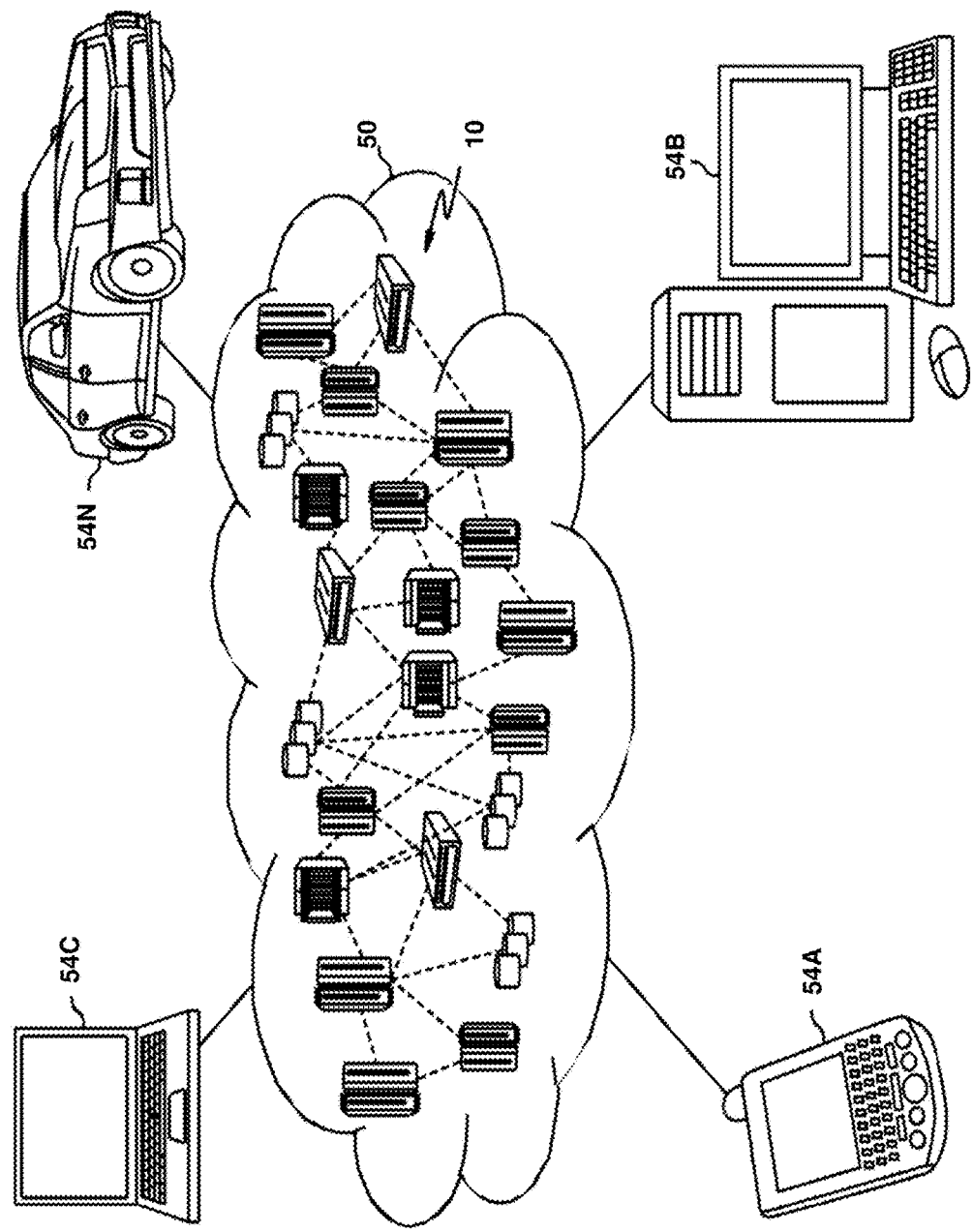
FIG. 1 depicts a cloud computing environment according to one or more embodiments of the present invention.

The diagrams depicted herein are illustrative. There can be many variations to the diagram or the operations described therein without departing from the spirit of the invention. For instance, the actions can be performed in a differing order or actions can be added, deleted, or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems; storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
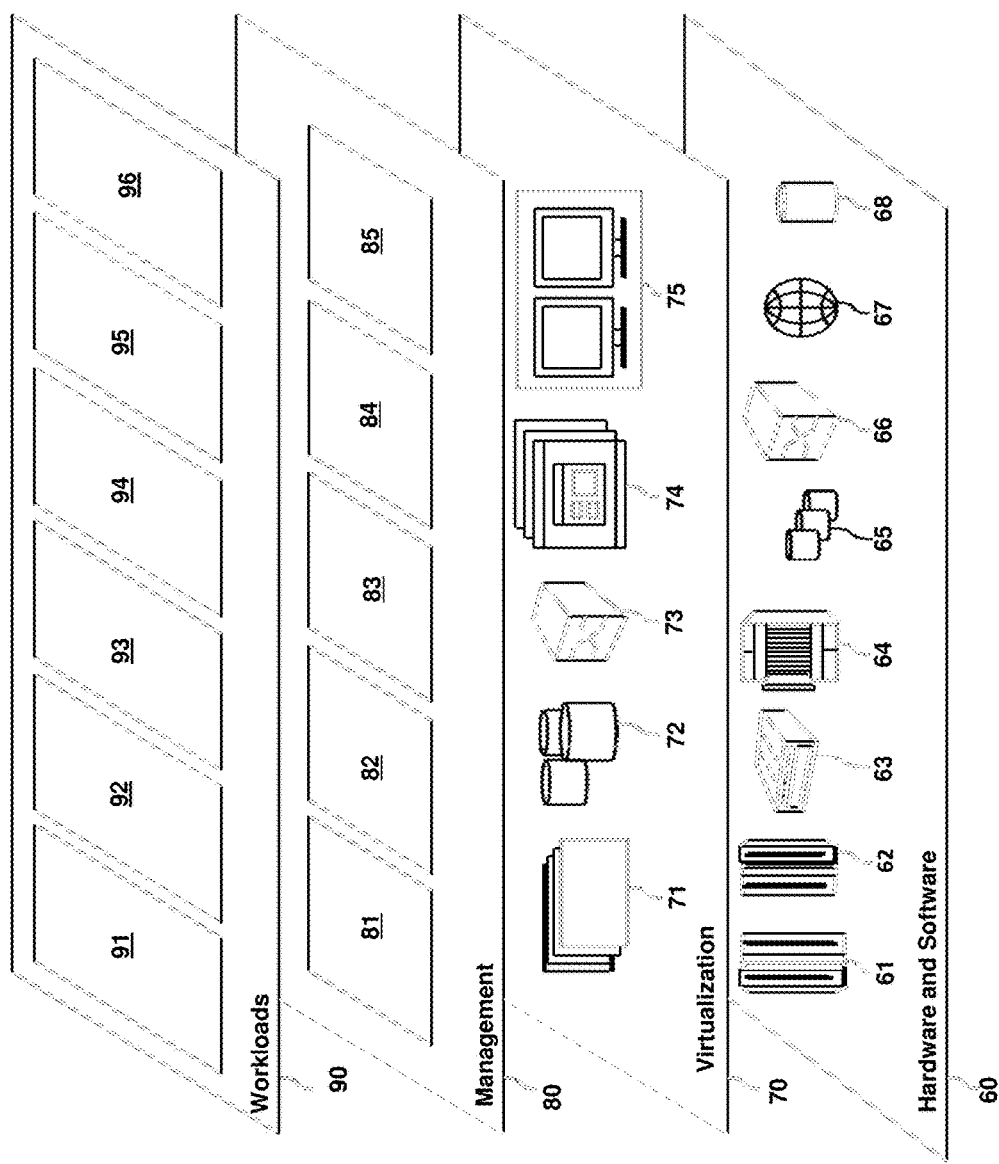
FIG. 2 depicts abstraction model layers according to one or more embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and API description file processing 96.

Turning now to an overview of technologies that are more specifically relevant to aspects of the invention, as noted above, API makes it easier for developers to use certain technologies when building applications. APIs simplify the process of programming an application as APIs abstract out the underlying implementation and only exposes objects or actions that are needed by a developer to build an application program. Some API providers utilize API management platforms to publish their APIs. In order to make APIs understandable and easy to use, an API description file using an API description language (DL) is usually published together.

For example, in the context of the Swagger Open Source framework, after an API developer submits their API code into Swagger, Swagger tooling can then be used to automatically generate an Open API document based on the submitted code itself. The Open API document is formatted in a standard description language for API usage. After deciding which API to use, application developers can start writing application code for their application by using the APIs themselves. Alternatively, a more modern method for developers to call the API is to use a software development kit (SDK) or other tools, like Swagger CodeGen to generate client and server code directly from the Open API document and then to embed the generated code into their applications. In this way, the developed application callers no longer need to build JavaBeans to describe the input and output of API themselves. In addition, the calling process is largely simplified since the generated code provides full encapsulation to the detailed implementation like URL, http, etc.

However, the methods identified above have various technical drawbacks. When APIs are changed, such as a new version of an API is released, applications that use these APIs may encounter complex updating process. In one example, the complex updating process performed by an application program developer includes obtaining new released Open API document from API management platform and then trying to obtain an understanding of the detailed changes from a developer portal or a readme document. The application program developer would then analyze how much their application would be affected by the new version of the API, and then use Swagger CodeGen to generate new Java code or JAR files using the new version Open API document. Subsequently, the application program developer would import the new Java code or JAR files into a project. The application program developer would then resolve compiling errors and identify changes in parameters and functions used in the Java code or JAR files to decide whether there is need to modify current code or add new code to make the project work.

The process referenced above is a time consuming, error-prone, and complex process that increases the difficulty of version migration. As such, some application developers are inclined to stay in the current version without performing an update, which would bring large maintenance costs to API developers over time.

Turning now to an overview of the aspects of the invention, one or more embodiments of the invention address the above-described shortcomings of the prior art by providing a method that intelligently discovers the difference between multiple released API documents and records the differences in the format of an a API difference description (ADD) file. The ADD file is a new type of file that is formatted as a structural machine-consumed data type, such as a JSON or XML for example. The ADD file is a linked list having a plurality of nodes (i.e., difference nodes). Each node represents a difference that is detected between a first version and a second version of an API description document. Each difference node includes at least four fields: a type of change field, a location of change field, a content changed field, and a next change field. In some embodiments of the present invention, the method includes automatically updating an application program using the ADD file. For example, in some embodiments of the present invention a code generator, such as Swagger CodeGen, is utilized to generate a patch file containing suggested code modifications to the original application program, the suggested code modifications are generated based, at least in part, on the ADD file. Developers can then apply the patch and review the suggested code modifications. Upon the suggested modifications being accepted, the new application code may be generated based on the patch to migrate the application from a first version to a second version.

Several technical benefits may be achieved by one or more embodiments of the present invention. Newly generated source code (e.g., Java code, JavaBeans, Java ARchive (JAR) files, etc.) would not need to be reviewed by an application programmer prior to applying and generating a patch file for the original application. For example, the JavaBeans or JAR files that are generated during the process would be transparent to the application programmer. The application programmer would not be required to manually resolve compiling errors and manually modify code (e.g., update API name in a Java Bean, update an API reference, etc.). The application programmer can review a suggested modification in the patch file via a source code manager (e.g., an Rational Team Concert (RTC) manager, etc.). The application programmer can choose whether to accept the recommended changes via the source code manager. If the application programmer approves the suggested modification, the application would then merge the new changesets and build a new application program. In this way, the application program is directly updated to the new version with minimal user effort. If the application programmer is not satisfied with the provided recommendation, the application programmer may perform their own modifications based on the patch.

Figure 3:
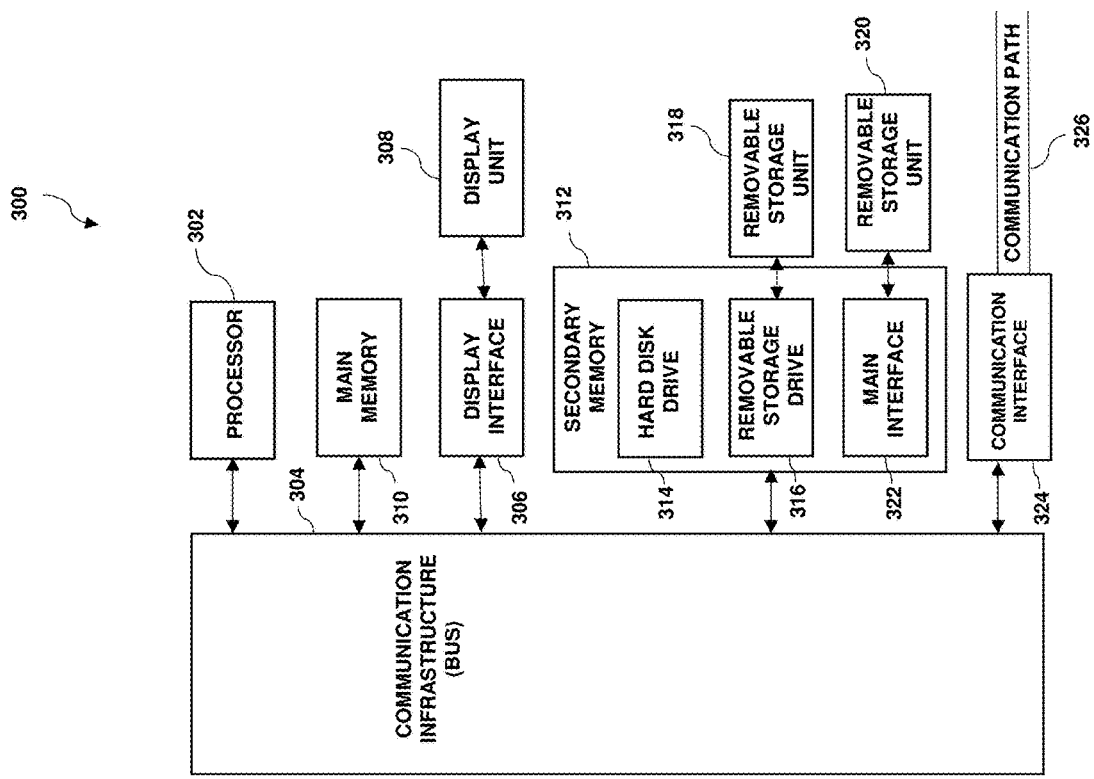
FIG. 3 depicts an exemplary computer system capable of implementing one or more embodiments of the present invention.

Turning now to a more detailed description of aspects of the present invention, FIG. 3 illustrates a high-level block diagram showing an example of a computer-based system 300 useful for implementing one or more embodiments of the invention. Although one exemplary computer system 300 is shown, computer system 300 includes a communication path 326, which connects computer system 300 to additional systems and may include one or more wide area networks (WANs) and/or local area networks (LANs) such as the internet, intranet(s), and/or wireless communication network(s). Computer system 300 and additional systems are in communication via communication path 326, (e.g., to communicate data between them).

Computer system 300 includes one or more processors, such as processor 302. Processor 302 is connected to a communication infrastructure 304 (e.g., a communications bus, cross-over bar, or network). Computer system 300 can include a display interface 306 that forwards graphics, text, and other data from communication infrastructure 304 (or from a frame buffer not shown) for display on a display unit 308. Computer system 300 also includes a main memory 310, preferably random access memory (RAM), and may also include a secondary memory 312. Secondary memory 312 may include, for example, a hard disk drive 314 and/or a removable storage drive 316, representing, for example, a floppy disk drive, a magnetic tape drive, or an optical disk drive. Removable storage drive 316 reads from and/or writes to a removable storage unit 318 in a manner well known to those having ordinary skill in the art. Removable storage unit 318 represents, for example, a floppy disk, a compact disc, a magnetic tape, or an optical disk, etc. which is read by and written to by a removable storage drive 316. As will be appreciated, removable storage unit 318 includes a computer readable medium having stored therein computer software and/or data.

In some alternative embodiments of the invention, secondary memory 312 may include other similar means for allowing computer programs or other instructions to be loaded into the computer system. Such means may include, for example, a removable storage unit 320 and an interface 322. Examples of such means may include a program package and package interface (such as that found in video game devices), a removable memory chip (such as an EPROM or PROM) and associated socket, and other removable storage units 320 and interfaces 322 which allow software and data to be transferred from the removable storage unit 320 to computer system 300.

Computer system 300 may also include a communications interface 324. Communications interface 324 allows software and data to be transferred between the computer system and external devices. Examples of communications interface 324 may include a modem, a network interface (such as an Ethernet card), a communications port, or a PCM-CIA slot and card, etc. Software and data transferred via communications interface 324 are in the form of signals which may be, for example, electronic, electromagnetic, optical, or other signals capable of being received by communications interface 324. These signals are provided to communications interface 324 via communication path (i.e., channel) 326. Communication path 326 carries signals and may be implemented using wire or cable, fiber optics, a phone line, a cellular phone link, an RF link, and/or other communications channels.

In the present disclosure, the terms "computer program medium," "computer usable medium," and "computer readable medium" are used to generally refer to media such as main memory 310 and secondary memory 312, removable storage drive 316, and a hard disk installed in hard disk drive 314. Computer programs (also called computer control logic) are stored in main memory 310, and/or secondary memory 312. Computer programs may also be received via communications interface 324. Such computer programs, when run, enable the computer system to perform the features of the present disclosure as discussed herein. In particular, the computer programs, when run, enable processor 302 to perform the features of the computer system. Accordingly, such computer programs represent controllers of the computer system.

Figure 4:
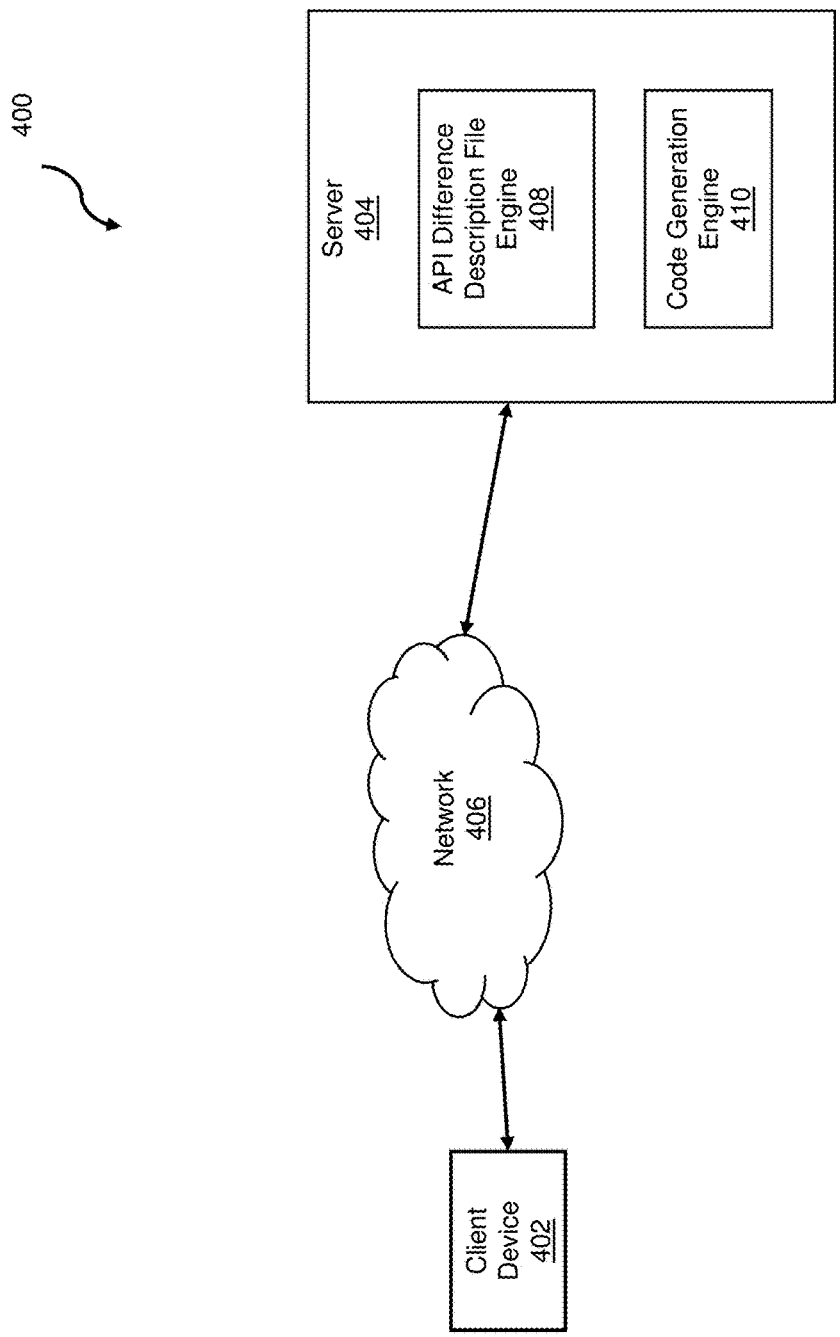
FIG. 4 depicts an exemplary system that facilitates ADD file generation and application migration in accordance with one or more embodiments of the present invention.

Referring now to FIG. 4, an exemplary system 400 for automated creation of an API difference description and migration of an application from a first version to a second in accordance with one or more embodiments of the present invention. System 400 includes a server 404 that may be in communication with one or more other devices, including, e.g., client device 402. In some embodiments of the present invention, the client device 402 communicates with the server 404 via a network 406.

Server 404 includes an API difference description file engine 408 (hereinafter ADD engine 408). The ADD engine 408 is configured to perform operations described herein including, for example, receiving a first a API description file, receiving a second API description file, and generating an ADD file that records the differences between the first and second API description files. In some embodiments of the present invention, certain aspects of the ADD engine 408 are configured to operate on the client device 402. In some embodiments of the present invention, certain aspects of the ADD engine 408 are configured to operate on both the server 404 and the client device 402

In some embodiments of the present invention, server 404 further includes a code generation engine 410. The code generation engine 410 is configured to perform operations described herein including, for example, migrating an application program from the first version to the second version by updating the application program using the API difference description file, in which the updating includes generating a code recommendation patch. In some embodiments of the present invention, certain aspects of the code generation engine 410 are configured to operate on the server 404 via one or more processors. In some embodiments of the present invention, certain aspects of the code generation engine 410 are configured to operate on the client device 402. In some embodiments of the present invention, certain aspects of the code generation engine 410 are configured to operate on both the server 404 and the client device 402.

Network 406 can be any suitable network, such as an IP-based network for communication between computer system 300 and any external device. Network 406 transmits and receives data between computer system 300 and devices and/or systems external to computer system 300. In some embodiments of the present invention, network 406 is implemented as part of a cloud computing environment 50 and/or a component of a communication path 326 of computer system 300. In some embodiments of the present invention, network 406 is a managed IP network administered by a service provider. In some embodiments of the present invention, Network 406 is a network internal to an aircraft, such as, for example, an avionics network, etc. In some embodiments of the present invention, network 406 is implemented in a wireless fashion, e.g., using wireless protocols and technologies, such as WiFi, WiMax, etc. In some embodiments of the present invention, Network 406 is a wired network, e.g., an Ethernet network, an ARINC 429 network, a CAN, etc., having any wired connectivity including, e.g., an RS232 connection, R5422 connection, etc. In some embodiments of the present invention, network 406 is a packet-switched network such as a local area network, wide area network, metropolitan area network, Internet network, or other similar type of network environment. In some embodiments of the present invention, network 406 is a fixed wireless network, a wireless local area network (LAN), a wireless wide area network (WAN), a personal area network (PAN), a virtual private network (VPN), intranet or other suitable network system.

API description files, such as web API description files, define a set of possible interactions with web services. API description files are often written in machine-understandable languages such as XML or JSON. Standardized description formats may include, for example, Web Application Description Language (WADL), Open API, Swagger, and RESTful API Modeling Language (RAML). While the formats differ in the specific information they encode, some fundamental parts may be common to each of the exemplary description languages. In some embodiments of the present invention, API description files specify certain resources that are exposed via hypertext transfer protocol (HTTP). In some embodiments of the present invention, the resources correspond to particular data elements, or correspond to one or more specific functionalities. In some embodiments of the present invention, the resources may be identified with URLs, sometimes split between parts common to all of the resources (such as, for example, URL schemes, hosts, and/or base path), and may also be specific to the particular resource.

In some embodiments of the present invention, an API description file, such as a web API description file, is a list of specific URLs and/or provides a recipe for constructing URLs systematically from parameters. For instance, a service exposing a resource for each of its registered users could provide, using the Swagger format, an API description of the form:

```
{
    schemes : [ "https" ],
    host: "api.example.com",
    basePath : "/v1",
    paths: [
        "/user/fuserIDg/profile" : { ... }, ...
    ]
}
```

Where the path element {userID} is a Swagger-specific notation for a path parameter, which may indicate that several resources can be accessed by substituting appropriate values. In some aspects, resources may be refined by appending additional query parameters.

Referring back to FIG. 4, ADD engine 408 is configured to receive a first API description file of a first version of a web API and receive a second API description file of a second version of the web API. In some embodiments of the present invention, the first and second API description files are provided by an external API provider who publically publishes the web API and the first and second API description files. In some embodiments of the present invention, the first and second API description files are generated by the server 404 itself rather than received from an external source.

ADD engine 408 is further configured to generate an ADD file that records differences that are detected between the first and second API description files. For example, in some embodiments of the present invention, ADD engine 408 is configured to automatically detect differences between multiple released Open API documents and record the detected differences in the format of an API difference description file. Various suitable methods for detecting differences between multiple API description files may be utilized. For example, in one implementation, a code checker tool can be used to detect differences between two API description files. The code checker may compare the literal differences between the two API documents. These detected differences would then be recorded into an ADD file, in which the ADD file is formatted in accordance with one or more embodiments of the present invention.

Figure 5:
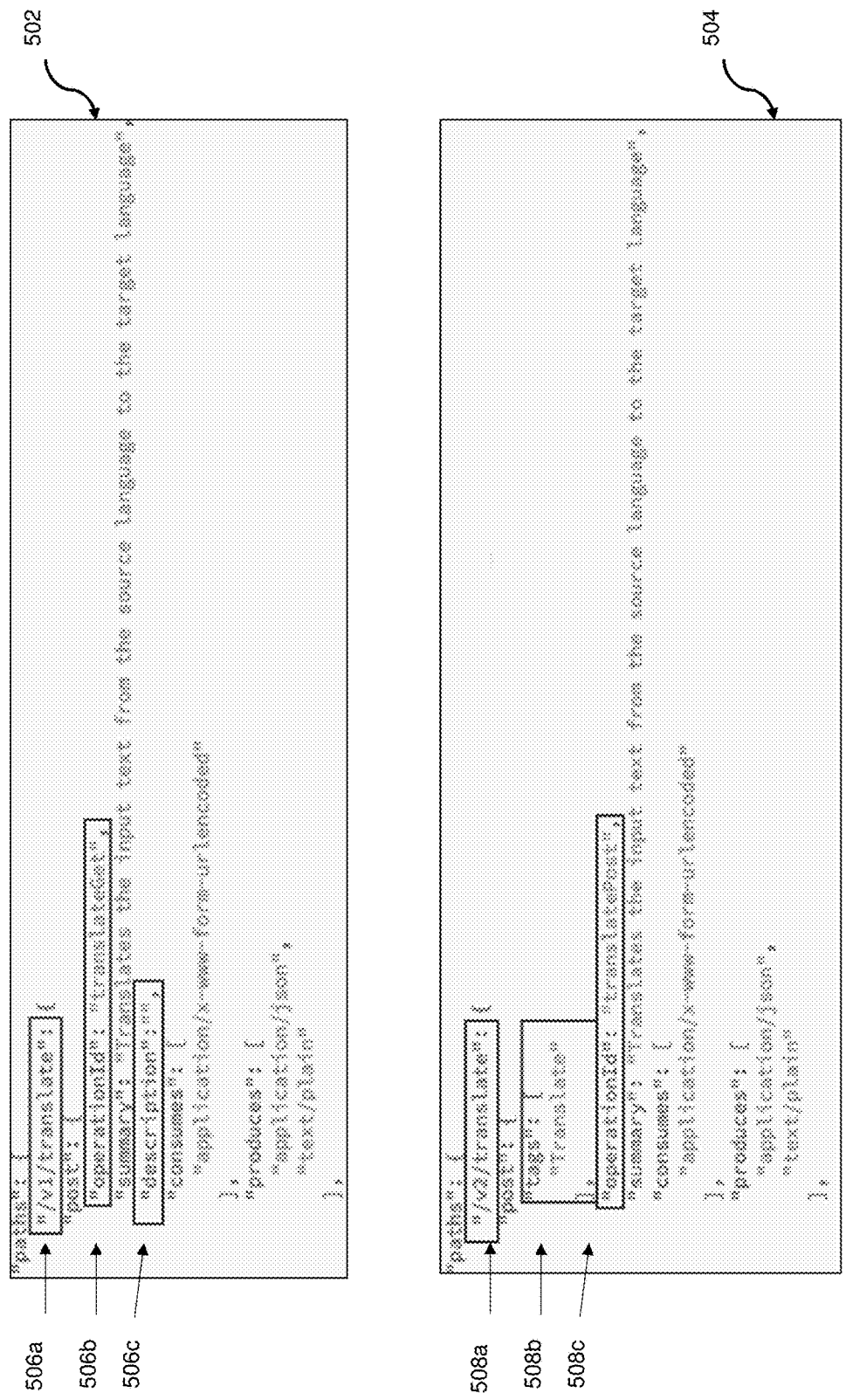
FIG. 5 depicts an exemplary first and second API description file in accordance with one or more embodiments of the present invention.
Figure 6:
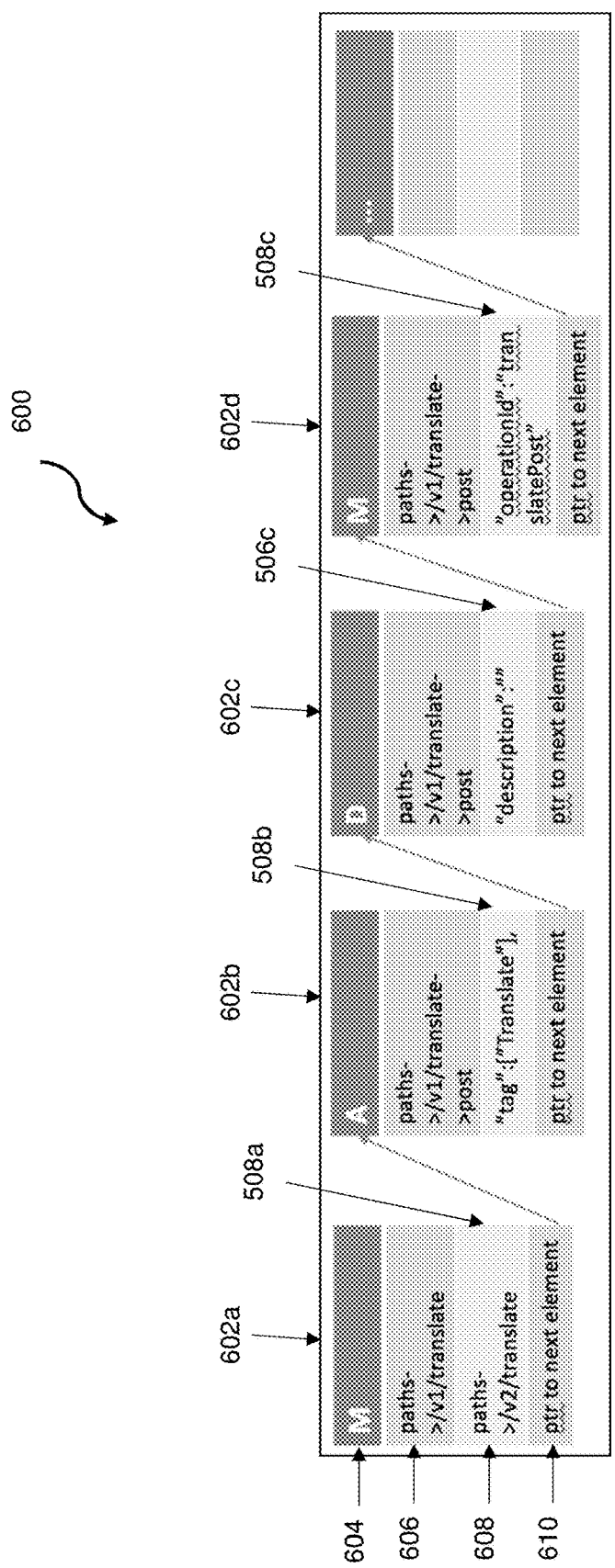
FIG. 6 depicts an exemplary ADD file in accordance with one or more embodiments of the present invention, in which the exemplary ADD file describes the differences between the exemplary first and second API description files of FIG. 5.

FIG. 5 depicts an example first API description file 502 and an example second API description file 504 (e.g., Swagger files) that may be received and processed in accordance with one or more embodiments of the present invention. The first API description file 502 pertains to a first version of a web API whereas the second API description file 504 pertains to a second version of the web API. Differences between the first API description file 502 and the second API description file 504 are detected by ADD engine 408. In this example, ADD engine 408 detected that the first API difference file has three lines of code (506a, 506b, and 506c) that are different from code found in the second API Difference file. ADD engine 408 detected that the second API difference file has three lines of code (508a, 5068, and 508c) that are different from code found in the first API Difference file. FIG. 6

FIG. 6 depicts an example ADD file 600 that is generated in accordance with one or more embodiments of the present invention, in which ADD file describes the differences between the first API description file 502 and the second API description file 504 of FIG. 5. As noted above, ADD file 600 is a linked list having a plurality of nodes (602a, 602b, 602c, 602d), called difference nodes, in which each difference node includes a plurality of fields (604, 606, 608, 610). Each difference node is associated with a particular detected difference. For example, in the context of the examples shown in FIGS. 4 and 5, node 602a is associated with modification of the text of line 506a to the text of line 508a; node 602b is associated with the addition of line 508a; node 602c is associated with the deletion of line 506c; and node 602d is associated with modification of the text of line 506b to the text of line 508c.

Each node of the plurality of nodes include at least a type of change field 604, a location of change field 606, a content changed field 608, and a next change field 608. The type of change field stores the change type of the node. The change types of the nodes can be an add type, a delete type, or a modify type. For example, the type of change field 604 of node 602a and 602d indicate that the change type of those nodes is type "M", which stands for the modify type. The type of change field 604 of node 602b indicates that the change type of the node is type "A", which stands for the add type. The type of change field 604 of node 602c indicates that the change type of the node is of type "D", which stands for the delete type.

The location of change field 606 of a particular node stores a parent path that indicates where in the first API description file 502 the changed content occurred. For example, if a new operation is added, the location of change field may be base path "/". If a new method is added to path "/mypath" for example, the location of change field may be "/mypath".

The content changed field 608 of a particular node stores the raw data of a particular difference that is detected between different versions of the API description files. For example, in FIG. 6, the content changed field 608 of node 602a indicates that line 506a has been modified to recite what is shown in line 508a. The content changed field 608 of node 602b indicates that line 508b was added. The content changed field 608 of node 602c indicates that line 506c was deleted. The content changed field 608 of node 602d indicates that line 506b has been modified to recite what is shown in line 508c.

The next change field 610 of a node stores a pointer that points to a next difference node of the plurality of nodes of the linked list. In some embodiments of the present invention, the next difference node is determined based on the order in which the differences were determined. In some embodiments of the present invention, the next difference node is a difference node which not been pointed by a preceding node, thus allowing each node of the plurality of nodes to be linked to at least one other node of the plurality of nodes. For example, in FIG. 6, the next change field 610 of node 602a points to node 602b, the next change field 610 of node 602b points to node 602c, the next change field 610 of node 602c points to node 602d. The next change field 610 of node 602d can point to another difference node such as a subsequent difference node or to an already linked difference node (e.g., pointers to 602a, 602b, or 602c).

Referring back to FIG. 4, in some embodiments of the present invention, code generation engine 410 is configured to migrate an application program from the first version to the second version by updating the application program using the ADD file. The generation engine 410 may comprise any suitable code generation process that is capable of performing the embodiments set forth herein. For example, in some embodiments of the present invention, the code generation engine 410 comprises a Swagger CodeGen tool that is configured to receive the ADD file and the second API description file as inputs and to generate new JavaBeans, Java code, and/or JAR files (hereinafter the generate code) for the second version. In some embodiments of the present invention, code generation engine 410 is further configured to generate a code recommendation patch for the application program to change the application from the first version to the second version based, at least in part, on the API change difference file and the second API description file.

In some embodiments of the present invention, the code generation engine 410 generates the code recommendation patch by importing the generated code into a project of the application program, resolving compiling errors, and discovering changes of parameters and functions used in the generated code to decide whether new code is to be added or current code is to be modified to make the project work with newly generated code. The code generation engine 410 generates a patch file that includes suggested code modifications based on the discovered changes, in which each suggested code modification comprises a changeset. For example, in some embodiments of the present invention, code generation engine 410 packages all the changesets into a patch file together with newly generated code. After an application programmer obtains the patch file from server 404, the application programmer can import the patch file into their current project and decide whether to accept the changesets in the patch. Code generation 410 and/or client device 402 then performers a merge process to replace the prior code with the newly generated code by adding the new code piece and modifying the old code piece for the project.

For example, in the context of the Swagger Open Source Framework, if a web API is migrated from a first version (v1) to a second version (v2), in some embodiments of the present invention, the code generation engine 410 would utilize the ADD file and the API description file of v2 as inputs to generate v2 JAR files. When an application programmer grants authority to server 404 to access the code of their application program, the code generation engine 410 would then import the generated v2 JAR files into the project, resolve compiling errors, and then automatically discover changes of parameters and functions used in the JAR files to decide whether new code should be added to the application program or whether current code of the application program should be modified to make the project work with the new JAR files (i.e., v2 JAR files). A patch file that includes suggested code modifications based on the discovered changes would then be generated, in which each suggested code modification comprises a changeset. In particular, the patch file would be generated by packing all the changesets together with the v2 JAR files.

The patch file would then be delivered to an application programmer via, for example, client device 402, to obtain approval from the application programmer. The application programmer can then import the patch file into their current project and accept the changesets provided by the patch. Code generation 410 and/or client device 402 then performers a merge process to replace v1 JAR files with the newly created v2 JAR files by adding new code pieces and modifying old code pieces of the project.

In some embodiments of the present invention, client device 402 and/or server 404 include a tool that allows the application programmer to review the suggested modifications from the provided patch file. In some embodiments of the present invention, the tool is implemented via a source code manager, for example an RTC, which allows the application programmer to approve or reject the suggested modifications. Upon the application programmer approving the suggested modification, the merge process would be employed to update the application program. By updating the application program in this way the way, the application programmer is able to directly update the application program to the new API version with minimal user effort. If the application programmer is not satisfied by the provided recommendation, the application programmer may write new application code based on the patch and publish the code via the tool.

Figure 7:
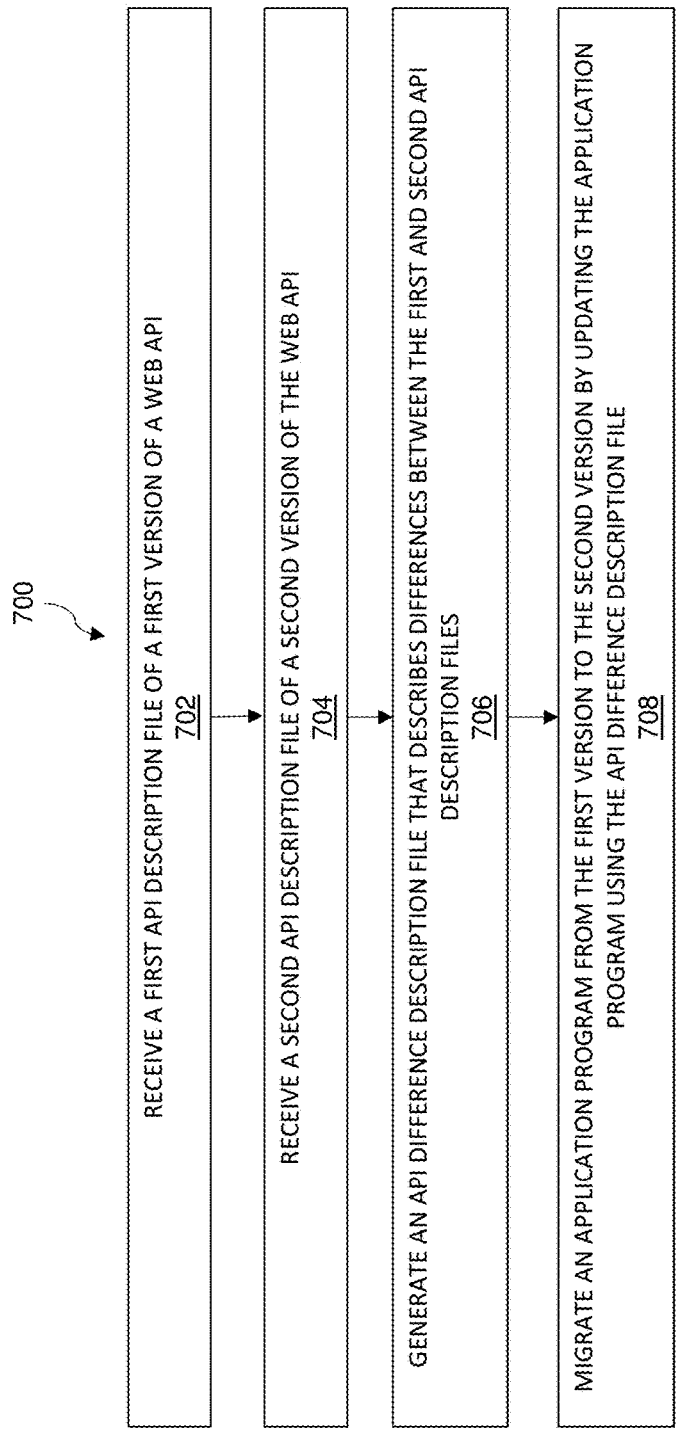
FIG. 7 depicts a flow diagram illustrating an example methodology in accordance with one or more embodiments of the present invention.

Additional details of the operation of system 400 will now be described with reference to FIG. 7, in which FIG. 7 depicts a flow diagram illustrating a methodology 700 according to one or more embodiments of the present invention. At 702, a first API description file of a first version of a web API is received (e.g., by ADD engine 408). At 704, a second API description file of a second version of the web API is received (e.g., by ADD engine 408). In some embodiments, step 702 and step 704 occur as a single step. In some embodiments, step 702 and step 704 occur as separate and distinct steps. At 706, an ADD file is generated that describes differences between the first and second API description files (e.g., by ADD engine 408). The API difference description file is a linked list comprising a plurality of nodes. Each node of the plurality of nodes is a difference node that includes a plurality of fields, wherein the plurality of fields include a type of change, a location of the change, a content changed, and a next change. At 708, an application program is migrated from the first version to the second version by updating the application program using the ADD file (e.g., by code generation engine 410, and/or client device 402). In some embodiments of the present invention, the updating of the application program includes receiving as inputs the ADD file and the second API description file, generating JAR files in the second version from the inputs, and generating a code recommendation patch for the application program to change or assist in changing the application from the first version to the second version (e.g., by code generation engine 410 and/or client device 402). The code recommendation patch is generated based, at least in part, on the ADD file and the second API description file.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
receiving, by a system comprising one more processors, a first application programming interface (API) description file of a first version of a web API;
receiving, by the system, a second API description file of a second version of the web API; and
generating, by the system, an API difference description file that describes differences between the first and second API description files; and
updating, by the system, an application program using the API difference description file;
wherein the API difference description file comprises a linked list comprising a plurality of nodes;
wherein each node of the plurality of nodes of the linked list of the API difference description file is a difference node that includes a plurality of fields;
wherein the plurality of fields of each difference node of the linked list include a type of change field, a location of change field, a content changed field, and a next change field;
wherein the next change field of each difference node of the plurality of nodes of the linked list stores a pointer that points to a next difference node of the plurality of nodes of the linked list; and
wherein the next difference node is determined based on an order in which the differences were determined such that the next difference node is a node of the plurality of nodes that has not been pointed to by a preceding node of the plurality of nodes.

2. The computer-implemented method of claim 1, wherein the plurality of fields further include a type of change field, a location of change field, and a content changed field.

3. The computer-implemented method of claim 2, wherein the location of change field of a node of the plurality of nodes stores a parent path indicating where in the first API description file changed content associated with the node occurred, wherein the changed content of the node is stored in the changed content field of the node.

4. The computer-implemented method of claim 2, wherein the type of change field of a node of the plurality of nodes stores a change type of the node, wherein the change type is an add type, a delete type, or a modify type.

5. The computer-implemented method of claim 1, wherein updating the application program using the API difference description file includes:
   receiving as inputs the API change difference file and the second API description file;
   generating JAR files in the second version from the inputs; and
   generating a code recommendation patch for the application program to change the application from the first version to the second version based at least in part on the second API description file and the plurality of nodes of the linked list of the API change difference file.

6. The computer-implemented method of claim 5, wherein generating the code recommendation patch further includes:
   importing the JAR files into a project of the application program;
   resolving compiling errors;
   discovering changes of parameters and functions used in the JAR files to decide whether new code is to be added or current code is to be modified; and
   generating a patch file that includes suggested code modifications, the suggested code modifications being based on the discovered changes.

7. A system comprising one or more processors configured to perform a method, the method comprising:
   receiving, by the system, a first application programming interface (API) description file of a first version of a web API;
   receiving, by the system, a second API description file of a second version of the web API;
   generating, by the system, an API difference description file that describes differences between the first and second API description files; and
   updating, by the system, an application program using the API difference description file;
   wherein the API difference description file comprises a linked list comprising a plurality of nodes;
   wherein each node of the plurality of nodes of the linked list of the API difference description file is a difference node that includes a plurality of fields;
   wherein the plurality of fields of each difference node of the linked list includes a next change field;
   wherein the next change field of each difference node of the plurality of nodes of the linked list stores a pointer that points to a next difference node of the plurality of nodes of the linked list; and
   wherein the next difference node is determined based on an order in which the differences were determined such that the next difference node is a node of the plurality of nodes that has not been pointed to by a preceding node of the plurality of nodes.

8. The system of claim 7, wherein the plurality of fields further includes a type of change field, a location of change field, and a content changed field.

9. The system of claim 8, wherein the location of change field of a node of the plurality of nodes stores a parent path indicating where in the first API description file changed content associated with the node occurred, wherein the changed content of the node is stored in the changed content field of the node.

10. The system of claim 8, wherein the type of change field of a node of the plurality of nodes stores a change type of the node, wherein the change type is an add type, a delete type, or a modify type.

11. The system of claim 7, wherein updating the application program using the API difference description file includes:
   receiving as inputs the API change difference file and the second API description file;
   generating JAR files in the second version from the inputs; and
   generating a code recommendation patch for the application program to change the application from the first version to the second version based at least in part on the second API description file and the plurality of nodes of the linked list of the API change difference file.

12. The system of claim 11, wherein generating the code recommendation patch further includes:
   importing the JAR files of java into a project of the application program;
   resolving compiling errors;
   discovering changes of parameters and functions used in the JAR files to decide whether new code is to be added or current code is to be modified; and
   generating a patch file that includes suggested code modifications, the suggest code modifications being based on the discovered changes.

13. A computer program product, the computer program product comprising a computer readable storage medium having program instructions embodied therewith, the program instructions executable by a system comprising one or more processors to cause the system to perform a method, the method comprising:
   receiving, by the system, a first application programming interface (API) description file of a first version of a web API;
   receiving, by the system, a second API description file of a second version of the web API;
   generating, by the system, an API difference description file that describes differences between the first and second API description files; and
   updating, by the system, an application program using the API difference description file;
   wherein the API difference description file comprises a linked list comprising a plurality of nodes;
   wherein each node of the plurality of nodes of the linked list of the API difference description file is a difference node that includes a plurality of fields;
   wherein the plurality of fields of each difference node of the linked list includes a next change field;
   wherein the next change field of each difference node of the plurality of nodes of the linked list stores a pointer that points to a next difference node of the plurality of nodes of the linked list; and
   wherein the next difference node is determined based on an order in which the differences were determined such that the next difference node is a node of the plurality of nodes that has not been pointed to by a preceding node of the plurality of nodes.

14. The computer program product of claim 13, wherein the plurality of fields further includes a type of change field, a location of change field, and a content changed field.

15. The computer program product of claim 14, wherein the location of change field of a node of the plurality of nodes stores a parent path indicating where in the first API description file changed content associated with the node occurred, wherein the changed content of the node is stored in the changed content field of the node.

16. The computer program product of claim 14, wherein the type of change field of a node of the plurality of nodes stores a change type of the node, wherein the change type is an add type, a delete type, or a modify type.

17. The computer program product of claim 13, wherein updating the application program using the API difference description file includes:
   receiving as inputs the API change difference file and the second API description file;
   generating JAR files in the second version from the inputs; and
   generating a code recommendation patch for the application program to change the application from the first version to the second version based at least in part on the second API description file and the plurality of nodes of the linked list of the API change difference file.

\* \* \* \* \*